United States Patent [19]
Grey

[11] Patent Number: 5,690,021
[45] Date of Patent: Nov. 25, 1997

[54] STRAINER INSERT FOR BLENDER

[76] Inventor: Ronald Grey, 11172 Western Ave., Stanton, Calif. 90680

[21] Appl. No.: 613,616

[22] Filed: Mar. 11, 1996

[51] Int. Cl.$^6$ .............................. A23N 1/00; B02C 15/00; B04B 5/10
[52] U.S. Cl. ................... 99/513; 99/501; 366/205
[58] Field of Search ...................... 99/510, 511, 513, 99/501, 503; 366/205, 314; 241/37.5, 92, 282.1, 282.2; 210/360.1, 380.1, 369

[56] References Cited

U.S. PATENT DOCUMENTS

| | | | |
|---|---|---|---|
| 959,581 | 5/1910 | Newton | 99/513 |
| 3,101,107 | 8/1963 | Posener et al. | 99/503 |
| 3,612,125 | 10/1971 | Krauth | 366/205 X |

Primary Examiner—David Scherbel
Assistant Examiner—Reginald L. Alexander
Attorney, Agent, or Firm—Dennis W. Beech

[57] ABSTRACT

The strainer insert is a cylindrical chamber having strainer openings about a portion of its circumference. The strainer chamber is open at both ends. The bottom end is attached to a mounting base which is attached to a blender base. When the strainer chamber is attached in a blender it is completely contained in the blender mixing chamber and it encloses the blender blades. Items such as fruits or vegetables may then be placed in the strainer chamber and the open end closed with a lid. When the blender is activated the blender chops or cuts up the items into solid pieces and produces a liquid. The liquid passes through the strainer openings to be poured out of the blender mixing chamber.

3 Claims, 1 Drawing Sheet

STRAINER INSERT FOR BLENDER

BACKGROUND OF THE INVENTION

1. Field of the Invention

This invention relates to the devices and apparatus used to strain or sieve liquid from solid pieces as for example in vegetable and fruit juice machines. The new device provides a simple means to use a food blender as a strainer.

2. Description of Related Art

There are currently in use various devices to make juice such as orange juice squeezers for removing the juice from the fruit. Such juice making devices may be hand operated as well as powered by electric motors.

In addition there are more elaborate devices such as food processors in which various fruits and vegetables may be placed and ground or blended into a liquid mixture. Such food processors are generally elaborate electric powered grinding machines rather than the more traditional common blending machine.

The present invention provides a simple method to modify the common blender used to mix drinks and other ingredients to be used as a strainer. The strainer insert fits into the blender mixing chamber in a manner which encloses the blender mixing blades. When solid items such as fruit are placed in the strainer insert and than chopped or cut by the blender mixing blades, the solid pieces are retained in the strainer insert while liquid flows out through the strainer openings.

SUMMARY OF THE INVENTION

A primary objective of the present invention is to provide a means to use a blender to separate liquid from solid objects such as fruits and vegetables. Another object is to separate the liquid such that it may then be poured into a container such as a glass without further straining being required.

In accordance with the description presented herein, other objectives of this invention will become apparent when the description and drawings are reviewed.

DESCRIPTION OF THE PREFERRED EMBODIMENT

The strainer insert consists of a cylindrical chamber having strainer openings about its circumference. There is a mounting base attached to the blender to which the strainer chamber is attached when in use. The strainer chamber has a top or lid on the end opposite the mounting base attachment to prevent solid particles from exiting the top during the blending operation.

Figure 1:
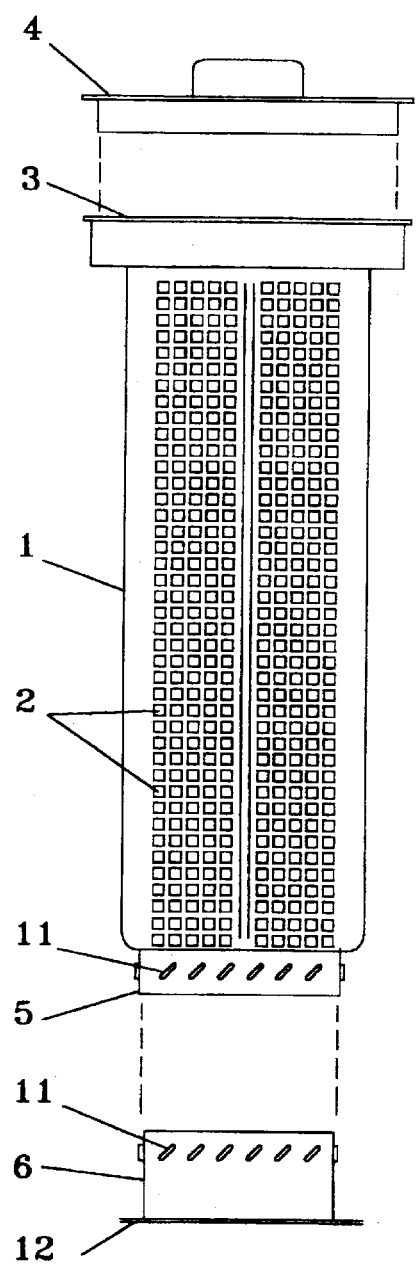
FIG. 1 illustrates an elevation view of the strainer insert with the base and the top separated.
Figure 2:
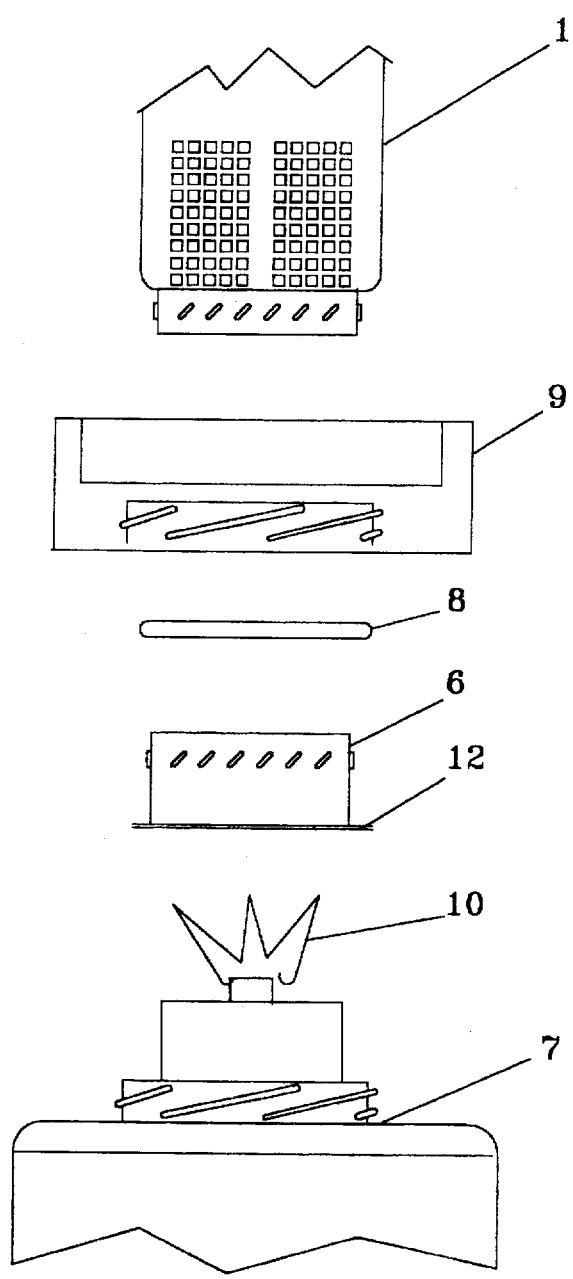
FIG. 2 illustrates an exploded view of the strainer insert and the elements of the blender to which attachment is made.

Referring to FIGS. 1 and 2, a strainer chamber (1) of cylindrical shape has strainer openings (2) about a portion of its circumference. The strainer chamber (1) has a lid recess (3) for purpose of attaching a lid (4). The lid recess (3) and lid (4) may be engaged by a friction fit, by means of cooperatively located threaded elements, or other suitable methods for closing.

On the strainer chamber (1) bottom end there is a mounting base attachment (5). A mounting base (6) is permanently attached to the blender base (7) by placing the mounting base (6) over the blender base (7) and placing the blender base sealing ring (8) and attachment ring (9) over a mounting base flange (12) to secure both the mounting base (6) and blender mixing chamber (not shown) to the blender base (7).

With this configuration, when the strainer chamber (1) is attached to the mounting base (6) the strainer chamber (1) is contained in the blender mixing chamber (not shown) and encloses the blender blades (10). The mounting base attachment (5) and mounting base (6) are illustrated with threads (11) for purpose of attachment.

Items from which liquid is to be extracted are placed in the strainer chamber (1) and the lid (4) attached. The blender mixing chamber is than closed and the blender activated. The action of the blender blades (10) chops, cuts and otherwise reduces the items in the strainer chamber (1) to solid pieces and liquid form. The solid pieces are retained in the strainer chamber (1) while any liquid is free to flow through the strainer openings (2). The liquid may then be poured from the blender mixing chamber as is normally done.

I claim:

1. A device for mounting in a blender mixing chamber and attachment to a blender base having a blender blade comprising:

a mounting base having a mounting base flange circumferentially attached around the mounting base such that the mounting base may be placed on the blender base with a sealing ring mounted on the mounting base flange and an attachment ring mounted on the mounting base and attached to the blender base to retain the mounting base and sealing ring in the mixing chamber;

a strainer chamber having a plurality of strainer openings defined therein; and the strainer chamber having a means for attachment to the mounting base such that the blender blade is contained in the strainer chamber.

2. A device for mounting in a blender mixing chamber and attachment to a blender base having a blender blade comprising:

a mounting base having a means for attachment to the blender base;

a strainer chamber of cylindrical form having a plurality of strainer openings defined therein and having an open end with a mounting base attachment; and the strainer chamber having a plurality of threads circumferentially located about the mounting base attachment for threading into the mounting base having threads therein such that when the strainer chamber is attached to the mounting base the blender blade is contained in the strainer chamber.

3. The device as in claim 2 wherein the strainer chamber is open at an end opposite the mounting base attachment with a lid recess defined therein and a means for attaching a lid.

* * * * *